United States Patent
Morishita et al.

(10) Patent No.: US 7,294,410 B2
(45) Date of Patent: Nov. 13, 2007

(54) METHOD OF COATING WITH LEAD-FREE ELECTRODEPOSITION COATING COMPOSITION AND COATED ARTICLE

(75) Inventors: Hiroyuki Morishita, Saitama (JP); Katsuyoshi Kaneko, Saitama (JP); Fumiaki Niisato, Saitama (JP); Toshiyuki Ishii, Tokyo (JP)

(73) Assignees: Honda Motor Co., Ltd. (JP); Nippon Paint Co., Ltd. (JP)

( * ) Notice: Subject to any disclaimer, the term of this patent is extended or adjusted under 35 U.S.C. 154(b) by 0 days.

(21) Appl. No.: 10/547,909

(22) PCT Filed: Mar. 3, 2004

(86) PCT No.: PCT/JP2004/002682

§ 371 (c)(1),
(2), (4) Date: Jan. 20, 2006

(87) PCT Pub. No.: WO2004/078857

PCT Pub. Date: Sep. 16, 2004

(65) Prior Publication Data

US 2006/0124462 A1 Jun. 15, 2006

(30) Foreign Application Priority Data

Mar. 5, 2003 (JP) .............................. 2003-059026

(51) Int. Cl.
*B32B 15/08* (2006.01)
*B32B 15/18* (2006.01)
*C25D 13/08* (2006.01)
*B62D 63/04* (2006.01)

(52) U.S. Cl. ................ 428/626; 428/457; 428/632; 428/659; 205/320; 205/414; 427/407.1; 180/89.1

(58) Field of Classification Search ................ 428/626, 428/632, 633, 630, 658, 659, 457, 469, 472; 427/384, 407.1, 419.2; 205/316, 317, 320, 205/333, 414; 180/89.1, 311
See application file for complete search history.

(56) References Cited

U.S. PATENT DOCUMENTS

| 4,853,285 A | * | 8/1989 | Sobata et al. ................ 428/336 |
| 2002/0098345 A1 | * | 7/2002 | Kamo et al. ................ 428/336 |
| 2004/0026248 A1 | * | 2/2004 | Uchidoi et al. ............. 204/473 |

FOREIGN PATENT DOCUMENTS

JP  2000309730  11/2000

OTHER PUBLICATIONS

Pohang Iron & Steel Co. Ltd., Derwent Publications Ltd. London, GB XP002289193 Jul. 4, 2001.

* cited by examiner

*Primary Examiner*—Michael E. LaVilla
(74) *Attorney, Agent, or Firm*—Dorsey & Whitney LLP

(57) ABSTRACT

The present invention relates to a cationic electrodeposition coating composition substantially free of lead compounds, and more specifically to a method of coating an alloyed hot-dip galvanized steel plate with the composition and a coated article obtained by the method having edge portions and general surfaces excellent in corrosion resistance. The invention provides a method of coating an alloyed hotdip galvanized steel plate with a lead-free cationic electrodeposition coating composition containing a rust preventive pigment to form an electrodeposition coating film excellent in corrosion resistance, and a coated article obtained by the electrodeposition.

6 Claims, No Drawings

METHOD OF COATING WITH LEAD-FREE ELECTRODEPOSITION COATING COMPOSITION AND COATED ARTICLE

The present application is a national phase application of International Application No. PCT/JP2004/002682 filed on Mar. 3, 2004, and claims priority from such International application pursuant to 35 U.S.C. § 365. In addition, the present application claims priority from Japanese Application No. 2003-059026 filed on Mar. 5, 2003. The entire disclosures of the above-identified International and Japanese applications are incorporated herein by reference.

TECHNICAL FIELD

The present invention relates to a cationic electrodeposition coating composition substantially free of lead compounds, and more specifically to a method of coating an alloyed hot-dip galvanized steel plate with the composition, capable of forming edge portions and general surfaces excellent in corrosion resistance, and a coated article obtained by the method.

BACKGROUND ART

Cationic electrodeposition coating has been used for undercoating bodies and parts of automobiles, and required to form coating films with high corrosion resistance. However, lead compounds, which have been used as highly corrosion-resistant rust preventive pigments, are not preferred from an environmental point of view. Consequently, various non- or less-toxic, lead-free, rust preventive pigments have been developed and described in JP-A-2000-309730, etc. Proposed in JP-A-2000-309730 is a cationic electrodeposition coating composition containing a basic zinc silicate having a zinc/silicon mole ratio of 1.1/1 to 2.5/1 as the rust preventive pigment.

DISCLOSURE OF THE INVENTION

An object of the present invention is to provide a method of coating an alloyed hot-dip galvanized steel plate with a lead-free electrodeposition coating composition containing a rust preventive pigment to form an electrodeposition coating film excellent in corrosion resistance, and a coated article obtained by electrodeposition coating.

As a result of intense research in view of the above object, the invention has been accomplished by the following embodiments.

Thus, a method of the invention is for coating an alloyed hot-dip galvanized steel plate with a lead-free cationic electrodeposition coating composition including a binder resin and a plurality of pigments, and comprises the step of electrodepositing the lead-free cationic electrodeposition coating composition onto the alloyed hot-dip galvanized steel plate, wherein the binder resin includes a cationic base resin and a crosslinking agent, and the pigments include 5 to 30% by mass of an aluminum phosphate pigment and 5 to 30% by mass of a silicon oxide pigment having a pore volume of 0.44 to 1.8 ml/g and an average particle size of 10 µm or less. The lead-free cationic electrodeposition coating composition may further include 0.1 to 10% by mass of a monoalkyltin compound based on the mass of the solid contents of the binder resin.

A coated article of the invention is an article such as an automobile body comprising the alloyed hot-dip galvanized steel plate coated with the lead-free cationic electrodeposition coating film by the above method. The coated article may comprise a multilayer film, which has an undercoat, an intermediate coat, an overcoat, etc. on the lead-free cationic electrodeposition coating film if necessary.

DETAILED DESCRIPTION OF THE INVENTION

The present invention is described in detail below.

In the lead-free cationic electrodeposition coating composition used in the method of the invention, the term "lead-free" means that the composition substantially contains no lead (including lead in lead compounds). The detection limit of lead has been lowered year after year by advancement of analytical instruments, and in the invention, the term "lead-free" specifically means that the lead content of the composition is 10 ppm or less.

The aluminum phosphate pigment is added to the lead-free cationic electrodeposition coating composition used in the method of the invention. Examples of the aluminum phosphate pigments include aluminum dihydrogen tripolyphosphate, aluminum metaphosphate, and aluminum pyrophosphate. The aluminum phosphate pigments may be used alone or combined with each other. The mass ratio of the aluminum phosphate pigment to all the pigments in the composition is 5 to 30% by mass, preferably 10 to 20% by mass. When the mass ratio is less than 5% by mass, the composition cannot show a sufficient rust preventive property. On the other hand, when the mass ratio is more than 30% by mass, the smoothness of the electrodeposition coating film is reduced.

In the invention, the silicon oxide pigment is used as a rust preventive pigment in combination with the aluminum phosphate pigment. The pore volume of the silicon oxide pigment is 0.44 to 1.8 ml/g, preferably 0.7 to 1.6 ml/g, and the average particle size of the silicon oxide pigment is 10 µm or less, preferably 1 to 8 µm. The silicon oxide pigment may be any fine particles that comprise silicon dioxide as a main component and have the pore volume and the average particle size within the above ranges, such as fine particles of colloidal silica or fumed silica. When the pore volume of the silicon oxide pigment is less than 0.44 ml/g, the lead-free cationic electrodeposition coating composition cannot show a sufficient corrosion resistance. On the other hand, when the pore volume is more than 1.8 ml/g, the stability of the composition is reduced. Further, when the average particle size is more than 10 µm the appearance of the electrodeposition coating film is deteriorated.

The mass ratio of the silicon oxide pigment to all the pigments in the lead-free cationic electrodeposition coating composition is 5 to 30% by mass, preferably 10 to 20% by mass. When the mass ratio is less than 5% by mass, the composition cannot show a sufficient rust preventive property occasionally. On the other hand, when the mass ratio is more than 30% by mass, there is a case where the smoothness of the electrodeposition coating film is reduced.

The lead-free cationic electrodeposition coating composition used in the method Of the invention preferably comprises a monoalkyltin compound as a curing catalyst (or a dissociation catalyst for a blocked polyisocyanate compound). The monoalkyltin compound is low in volatility, and thereby hardly transferred into an upper coating film in the case where the electrodeposition coating film of the composition is coated wet-on-wet with a chipping primer or an intermediate coating after the electrodeposition coating and then baked, or in the case where a chipping primer or an intermediate coating is applied and baked after baking the electrodeposition coating film. Thus, the formed electrodeposition coating film using the monoalkyltin compound is excellent in adhesion to an upper coating film, and hardly deteriorates the surface of the upper coating film to show excellent film performances because the catalyst is not volatile. The monoalkyltin compound is preferably monobutyltin oxide though there are no particular restrictions thereon. Examples of the monoalkyltin compounds include monobutyltin trioctanoate, monobutyltin triacetate, monobutyltin tribenzoate, monobutyltin trioctylate, monobutyltin trilaurate, monobutyltin trimyristate, monomethyltin triformate, monomethyltin triacetate, monomethyltin trioctylate, monooctyltin triacetate, monooctyltin trioctylate, monooctyltin trilaurate, monolauryltin triacetate, monolauryltin trioctylate, and monolauryltin trilaurate. These monoalkyltin compounds may be used singly or in combination of 2 or more compounds. Further, other dissociation catalysts to be hereinafter described may be used with the monoalkyltin compounds as long as they do not reduce the advantageous effects of the invention.

A method for introducing the monobutyltin compound into the lead-free cationic electrodeposition coating composition is not particularly restricted. In the case where the monobutyltin compound is solid, the monobutyltin compound is preferably dispersed using a dispersing resin as well as the pigments. Further, in the case where the monobutyltin compound is liquid, it may be dissolved in or mixed with the binder resin and introduced as a part of the binder component.

The mass ratio of the monobutyltin compound to the solid contents of the binder resin is preferably 0.1 to 10% by mass, more preferably 0.5 to 7.0% by mass. When the mass ratio of the monobutyltin compound is less than 0.1% by mass, the monobutyltin compound is occasionally insufficient in catalytic activity. On the other hand, when the mass ratio is increased to more than 10% by mass, the catalytic activity cannot be correspondingly improved, and further, there is a case where the electrodeposition coating film is decomposed by over baking.

The lead-free cationic electrodeposition coating composition used in the method of the invention may contain zinc ions in addition to the monobutyltin compound to increase the curing efficiency. An inorganic zinc compound such as zinc oxide and zinc hydroxide or an organic zinc compound may be used to maintain the concentration of the zinc ions at the predetermined degree. The zinc compounds may be used alone or in combination of 2 or more compounds.

Examples of the organic zinc compounds include zinc salts of organic mono- or di-acids such as formic acid, acetic acid, butyric acid, caproic acid, octylic acid, lauric acid, myristic acid, palmitic acid, stearic acid, behenic acid, neodecanoic acid, acrylic acid, crotonic acid, isocrotonic acid, undecylenic acid, oleic acid, erucic acid, sorbic acid, linolic acid, linolenic acid, bisphenylacetic acid, bisphenylbutyric acid, bisphenylpropionic acid, biscyclopentane carboxylic acid, bisacetoacetic acid, benzoic acid, methylbenzoic acid, bismethoxybenzoic acid, bis(tert-butyl)benzoic acid, bishydroxybenzoic acid, phthalic anhydride, terephthalic acid, succinic acid, maleic acid, maleic anhydride, and fumaric acid.

The zinc ion content of the lead-free cationic electrodeposition coating composition is preferably 100 to 2,000 ppm, more preferably 300 to 1,000 ppm. When the zinc ion content is less than 100 ppm, there is a case where the dissociation catalyst to be hereinafter described cannot show sufficient activity, resulting in insufficient curing of the electrodeposition coating film. On the other hand, when the zinc ion content is more than 2,000 ppm, the electrodeposition coating film appearance and the electrodeposition coating workability are occasionally deteriorated.

The cationic base resin is preferably such that the electrodeposition coating film has high corrosion resistance. Examples of such cationic base resins include amino-epoxy resins, amino group-containing acrylic resins, amino group-containing polyester resins, etc. Among them, preferred are amino-epoxy resins. The amino-epoxy resins can be obtained such that epoxy rings of an epoxy resin is opened by an amine compound such as an acid salt of a primary, secondary or tertiary amine, and cationized.

The epoxy resin used as a starting material for the cationic base resin may be a polyphenol-polyglycidyl ether-type epoxy resin, which is a product of a reaction between epichlorohydrin and a polycyclic phenol compound such as bisphenol A, bisphenol F, bisphenol S, phenol novolac, and cresol novolac, or a modified epoxy resin having an oxazolidone ring. The epoxy resin is preferably the modified epoxy resin having an oxazolidone ring. The modified epoxy resin can be obtained by a dealcoholization reaction of an epoxy resin with a bisurethane compound prepared by a reaction between a diisocyanate compound and one active hydrogen compound or with a heterourethane compound prepared by a reaction between a diisocyanate compound and 2 or more active hydrogen compounds. In the case of using the modified epoxy resin having an oxazolidone ring as the base resin, the electrodeposition coating film has excellent corrosion resistance.

The amine value of the cationic base resin is preferably 30 to 130, more preferably 40 to 80, and the number average molecular weight is preferably 1,000 to 20,000. When the amine value is less than 30, it is difficult to emulsify the cationic base resin. When the amine value is more than 130, there is a fear that the electric conductivity of the resin is increased, thereby reducing the gas pin property, reducing the Coulomb efficiency, or being disadvantageous in the electrodeposition coating workability including re-dissolubility, etc.

Examples of acids for neutralizing the cationic base resin include water-soluble organic acids such as formic acid, acetic acid, propionic acid, lactic acid, citric acid, malic acid, tartaric acid, and acrylic acid; and inorganic acids such as hydrochloric acid, phosphoric acid, and sulfamic acid. Among them, preferred are acetic acid, lactic acid, propionic acid, formic acid, and sulfamic acid.

Preferably usable as the crosslinking agent are blocked polyisocyanate compounds and etherified melamine resins. The blocked polyisocyanate compounds are such that isocyanate groups of a polyisocyanate compound are completely or partly blocked by a blocking agent. The blocking agent in the blocked polyisocyanate compound is dissociated by heating in the baking process after the electrodeposition, and the generated isocyanate groups are reacted with functional groups of the cationic base resin, thereby hardening the resin. The etherified melamine resins are obtained by etherifying melamine with an alcohol such as methanol and butanol. The etherified melamine resin is subjected to a transetherification with the cationic base resin to promote the crosslinking reaction in the baking process after the electrodeposition as the blocked polyisocyanate compound.

Examples of the polyisocyanate compounds used as a material for the blocked polyisocyanate compound include aliphatic diisocyanate compounds such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, and butylidene diisocyanate; aliphatic, cyclic diisocyanate compounds such as 1,3-cyclopentane diisocyanate, 1,4-cyclohexane diisocyanate, 1,2-cyclohexane diisocyanate, isophorone diisocyanate, and norbornane diisocyanate; aliphatic-aromatic isocyanate compounds such as m-phenylene diisocyanate, p-phenylene diisocyanate, 4,4'-biphenyl diisocyanate, 1,5-naphthalene diisocyanate, 1,4-naphthalene diisocyanate, 4,4'-diphenylmethane diisocyanate, 2,4- or 2,6-toluene diisocyanate or mixtures thereof, 4,4'-toluidine diisocyanate, and 1,4-xylene diisocyanate; aromatic diisocyanate compounds such as dianisidine diisocyanate, 4,4'-diphenyl ether diisocyanate, and chlorodiphenyl diisocyanate; triisocyanate compounds such as triphenylmethane-4,4',4''-triisocyanate, 1,3,5-triisocyanate benzene, and 2,4,6-triisocyanate toluene; tetraisocyanate compounds such as 4,4'-diphenyl-dimethylmethane-2,2',5,5'-tetraisocyanate; and polymerized polyisocyanate compounds such as toluene diisocyanate dimer and toluene diisocyanate trimer. Among them, preferred polyisocyanate compounds are isophorone diisocyanate, norbornane diisocyanate, and 4,4'-diphenylmethane diisocyanate.

Examples of the blocking agents for blocking the isocyanate groups include halogenated hydrocarbons such as 1-chloro-2-propanol and ethylene chlorohydrin; aliphatic or heterocyclic alcohols such as n-propanol, furfuryl alcohol, and alkyl-substituted furfuryl alcohols; phenol compounds such as phenol, m-creosol, p-nitrophenol, p-chlorophenol, and nonylphenol; oxime compounds such as methyl ethyl ketoxime, methyl isobutyl ketone oxime, acetone oxime, and cyclohexanone oxime; active methylene compounds such as acetylacetone, ethyl acetoacetate, and diethyl malonate; aliphatic alcohols such as ε-caprolactam, methanol, ethanol, and isopropanol; aromatic alcohols such as benzyl alcohol; glycol ethers such as ethylene glycol monomethyl ether, ethylene glycol monoethyl ether, ethylene glycol monobutyl ether, and diethylene glycol monomethyl ether; etc. Among them, preferred are methyl ethyl ketoxime and ε-caprolactam.

In the lead-free cationic electrodeposition coating composition, the solid content ratio of the cationic base resin/the crosslinking agent is preferably 50/50 to 90/10, more preferably 60/40 to 80/20. When the ratio is not within the range of 50/50 to 90/10, the curing efficiency is often insufficient.

An organic solvent may be used with water in the lead-free cationic electrodeposition coating composition. Examples of the organic solvents include water-miscible organic solvents such as methoxypropanol, ethyl cellosolve, propyl cellosolve, butyl cellosolve, 2-ethylhexyl cellosolve, n-hexyl cellosolve, methanol, ethanol, isopropyl alcohol, n-butanol, isobutanol, ethylene glycol dimethyl ether, diacetone alcohol, acetone, methyl ethyl ketone, methoxybutanol, dioxane, and ethylene glycol monoethyl ether acetate; and water-nonmiscible organic solvents such as xylene, toluene, methyl isobutyl ketone, hexane, carbon tetrachloride, 2-ethylhexanol, isophorone, cyclohexane, and benzene. Among them, preferred organic solvents are butyl cellosolve, 2-ethylhexyl cellosolve, and n-hexyl cellosolve, which are excellent in film forming properties. The amount of the organic solvent is preferably 0.1 to 10 parts by mass per 100 parts by mass of the solid contents of the cationic base resin and the crosslinking agent.

In the invention, though the monoalkyltin compound is recommended as the dissociation catalyst for dissociating the blocking agent, other dissociation catalysts may be used. Examples of the other dissociation catalysts include organic tin compounds such as dibutyltin laurate, dibutyltin oxide, and dioctyltin oxide; -amine compounds such as N-methylmorpholine; and salts of metals such as strontium, cobalt, and copper. The mass ratio of the dissociation catalyst to the solid contents of the binder resin is preferably 0.1 to 10% by mass, more preferably 1.0 to 7.0% by mass. When the mass ratio is less than 0.1% by mass, the catalytic activity is often insufficient. On the other hand, when the mass ratio is increased to more than 10% by mass, the catalytic activity cannot be correspondingly improved, and further, there is a case where the electrodeposition coating film is decomposed by over baking.

In addition, crosslinking resin particles, pigments, and various additives may be added to the lead-free cationic electrodeposition coating composition if necessary. Efficiency of maintaining the thickness of the edge portion of the coated article can be improved by adding the crosslinking resin particles. The crosslinking resin particles may be generated from an acrylic resin, an epoxy resin, a phenol resin, a melamine resin, etc. The crosslinking resin particles are particularly preferably such as using an acrylic resin from the viewpoint of production easiness. The number average particle size of the crosslinking resin particles is preferably 0.02 to 30 µm.

Examples of the pigments used in combination with the aluminum phosphate pigment and the silicon oxide pigment include color pigments such as titanium oxide, iron oxide red, and carbon black; extender pigments such as aluminum silicate and precipitated barium sulfate; and rust preventive pigments including phosphomolybdates, which are salts of phosphomolybdic acid and a di- or tri-valent metal such as aluminum, iron, titanium, zirconium, manganese, cobalt, nickel, copper, zinc, and silicon. In the case where the lead-free cationic electrodeposition coating composition contains such a pigment, the composition may further contain a resin for dispersing the pigment.

The total amount of the aluminum phosphate pigment, the silicon oxide pigment and the other pigments is 0.2 to 100 parts by mass, preferably 0.5 to 50 parts by mass, based on the solid contents of the binder resin.

The lead-free cationic electrodeposition coating composition may be prepared by dispersing the above-mentioned components in an aqueous medium of the organic solvent and water containing the water-soluble organic acid or the inorganic acid as the neutralizer.

In the method of the invention, the lead-free cationic electrodeposition coating composition is applied to the alloyed hot-dip galvanized steel plate. In a preferred embodiment of the method, the lead-free cationic electrodeposition coating composition is diluted with deionized water to have the solid concentration of 5 to 40% by mass, preferably 15 to 25% by mass, and the pH value of the composition is adjusted to 5.5 to 8.5, and then the composition is introduced into an electrodeposition bath. The electrodeposition coating is preferably carried out under conditions of an electrodeposition bath temperature of 20 to 35° C., a coating voltage of 100 to 450 V, and a coating time of 1 to 5 minutes. In the process of baking the electrodeposition coating film after the electrodeposition, the substrate temperature is 100 to 250° C., preferably 140 to 180° C., and the curing time is 5 to 60 minutes, preferably 10 to 30 minutes. The dry thickness of the electrodeposition coating film is suitably 5 to 40 µm, more preferably 10 to 30 µm. The above electrodeposition coating conditions may be controlled to obtain the dry thickness.

The coated article of the invention is obtained by the method of the invention, in which the alloyed hot-dip galvanized steel plate is coated with the lead-free cationic electrodeposition coating composition. The coated article can be suitably used for automobile bodies, automobile parts, etc. A chipping primer coating film and an intermediate coating film may be formed on the electrodeposition coating film, and then, an overcoating film such as a lustering agent-containing film and a clear film may be formed thereon, if necessary. Though the electrodeposition coating film may be baked alone as described above, it may be coated wet-on-wet with the chipping primer coating film or the intermediate coating film before curing the composition to simultaneously baking the films. The chipping primer coating film, the intermediate coating film, and the overcoating film may be formed by using known compositions under known conditions for coating outer plates of automobiles, etc.

The invention will be described in more detail below with reference to Production Examples, Examples, and Comparative Examples. It should be noted that "part(s)" in Examples means "part(s) by mass".

PRODUCTION EXAMPLE 1

Preparation of Curing Agent 723 parts of isophorone diisocyanate, 333 parts of methyl isobutyl ketone, and 0.01 part of dibutyltin dilaurate were added to a flask equipped with a stirrer, a condenser, a nitrogen inlet tube, a thermometer, and a dropping funnel, and heated to 70° C. After the contents were uniformly dissolved, 610 parts of methyl ethyl ketone oxime was added dropwise over 2 hours, and the reaction was carried out while keeping the reaction temperature at 70° C. The infrared spectrum of the reaction mixture was measured during the reaction, and the reaction was continued until absorption of isocyanate groups was disappeared, to obtain a curing agent.

PRODUCTION EXAMPLE 2

Preparation of Epoxy-modified Cationic Base Resin 92 parts of 2,4-/2,6-tolylene diisocyanate (mass ratio 8/2), 95 parts of methyl isobutyl ketone (MIBK), and 0.5 parts of dibutyltin dilaurate were added to a flask equipped with a stirrer, a condenser, a nitrogen inlet tube, a thermometer, and a dropping funnel, and 21 parts of methanol was added thereto dropwise while stirring. The reaction was started at the room temperature, and the temperature of the reaction mixture was raised to 60° C. by heat generation. After 30 minutes of the reaction, 57 parts of ethylene glycol mono-2-ethylhexyl ether was added to the reaction mixture dropwise from the dropping funnel, and 42 parts of bisphenol A-propylene oxide 5-mol adduct was further added. The reaction was carried out mainly within the temperature range of 60 to 65° C. while measuring the infrared spectrum until absorption of isocyanate groups was disappeared.

To thus-obtained blocked polyisocyanate was added 365 parts of an epoxy resin having the epoxy equivalent of 188, which was synthesized from bisphenol A and epichlorohydrin, and the temperature of the mixture was raised to 125° C. Then, 1.0 part of benzyldimethylamine was added to the mixture, and reacted at 130° C. until the epoxy equivalent became 410. 87 parts of bisphenol A was added to the flask and reacted at 120° C., and as a result, the epoxy equivalent became 1,190. After cooling the resultant mixture, 11 parts of diethanolamine, 24 parts of N-methylethanolamine, and 25 parts of a 79% by mass MIBK solution of an aminoethylethanolamine ketimine compound were added to the mixture and reacted at 110° C. for 2 hours. Then, the mixture was diluted with MIBK such that the ratio of non-volatile components was 80%, to obtain an epoxy-modified base resin having a cationic group.

PRODUCTION EXAMPLE 3

Preparation of Main Emulsion 672 parts (solid content) of the base resin obtained in Production Example 2 and 209.1 parts (solid content) of the curing agent prepared in Production Example 1 were uniformly mixed, and to the resultant mixture was added 3% by mass of ethylene glycol mono-2-ethylhexyl ether based on the mass of the solid contents. Formic acid was added to the resultant mixture such that the neutralization ratio (the ratio of neutralizing the cationic groups of the resin) is 41.7%, and 25% by mass of a 25% aqueous solution of zinc acetate and ion-exchange water were added to dilute the mixture such that the mass ratio of the solid contents was 30.0% by mass. Then, MIBK was removed under a reduced pressure until the mass ratio of the solid contents became 36.0% by mass, to prepare a main emulsion.

PRODUCTION EXAMPLE 4

Preparation of Pigment Dispersing Varnish

A bisphenol-type epoxy resin having an epoxy equivalent of 450 was reacted with a 2-ethylhexanol-half-blocked isophorone diisocyanate. The resultant was converted to a tertiary sulfonium with 1-(2-hydroxyethylthio)-2-propanol and dimethylolpropionic acid, to prepare a resin varnish for dispersing pigments having the tertiary sulfonium conversion ratio of 70.6% by mass and the solid resin content of 60% by mass.

EXAMPLE 1

<Preparation of Lead-free Electrodeposition Coating Composition>

50.0 parts of the resin varnish for dispersing pigments produced in Production Example 4, 100.0 parts of ion-exchange water, and 100.0 parts of the following granular mixture were dispersed by a sand grinding mill, and further grinded until the particle size became 10 μm or less, to obtain a dispersion paste containing 52.0% by mass of the solid contents, which contains 40% by mass of monobutyltin oxide and the pigments, and 12% by mass of the solid resin. The pore volume of the silicon oxide pigment was 1.6 m/g, and the average particle size thereof was 3.9 μm. The results are shown in Table 1.

TABLE 1

| Granular mixture | Mass ratio | Mass ratio based on total of pigments |
|---|---|---|
| Monobutyltin oxide | 3 | — |
| Aluminum tripolyphosphate | 20 | 20.6 |
| Silicon oxide | 20 | 20.6 |
| Titanium oxide | 26 | 26.8 |
| Carbon black | 1 | 1 |
| Kaolin | 30 | 31 |

Then, 2,000 parts of deionized water, 2,000 parts of the main emulsion of Production Example 3, and 500.0 parts of the dispersion paste were mixed to obtain a lead-free electrodeposition coating composition having the solid content of 20.0% by mass. The mass ratio of the monobutyltin oxide to the solid contents of the binder resin was 0.5% by mass, and the zinc ion content of the composition was 700 ppm.

<Electrodeposition Coating>

A sample of a cold-rolled unprocessed steel plate and a sample of a galvanized steel plate were prepared respectively. Each sample was degreased and pretreated with a zinc phosphate-based chemical treatment agent (trade name SURFDYNE 5000, manufactured by Nippon Paint Co., Ltd.) to be used as a negative electrode, and the above electrodeposition coating composition was electrodeposited under the conditions of the applied voltage of 150 to 250 V and the bath temperature of 30° C. to obtain an electrodeposition coating film having the dry thickness of 25 µm. The electrodeposition coating film was washed with water and baked at 170° C. for 20 minutes. The corrosion resistance of each electrodeposition coating film was analyzed. The results are shown in Table 2.

showed improved corrosion resistance without reduction of the smoothness in the case of using the cold-rolled steel plate or the galvanized steel plate.

In the method of the present invention, the alloyed hot-dip galvanized steel plate is coated with the lead-free cationic electrodeposition coating composition comprising the aluminum phosphate pigment and the silicon oxide pigment with the particular shape, whereby thus-obtained coated article of the invention has edge portions and general surfaces excellent in the corrosion resistance. Further, in the case of using the lead-free cationic electrodeposition coating composition containing the monoalkyltin compound, the formed coating film is excellent in adhesion to an upper coating film and hardly deteriorates the surface of the upper coating film to show excellent film performances. Furthermore, the nonvolatile catalyst is preferable in view of environment and industrial health. The coated article of the invention has the above characteristics, and thereby can be

TABLE 2

| | Items | Example 1 | Example 2 | Example 3 | Example 4 | Example 5 | Comparative Example 1 | Comparative Example 2 | Comparative Example 3 |
|---|---|---|---|---|---|---|---|---|---|
| | Monobutyltin oxide | 1.0 | 0.0 | 1.0 | 1.0 | 1.0 | 1.0 | 1.0 | 1.0 |
| Mass ratio | Aluminum tripolyphosphate | 20.6 | 20.6 | 5.2 | 30.0 | 15.4 | 30.0 | 0.0 | 41.2 |
| based on | Silicon oxide | 20.6 | 20.6 | 30.0 | 5.2 | 15.7 | 0.0 | 30.9 | 41.2 |
| total of | Titanium oxide | 26.8 | 26.8 | 26.8 | 26.8 | 26.8 | 26.8 | 26.8 | 16.6 |
| pigments | Carbon black | 1.0 | 1.0 | 1.0 | 1.0 | 1.0 | 1.0 | 1.0 | 1.0 |
| | Kaolin | 31.0 | 31.0 | 37.0 | 37.0 | 41.1 | 42.2 | 41.3 | 0.0 |
| | Zinc ion content (ppm) | 700 | 700 | 680 | 720 | 700 | 720 | 640 | 730 |
| Evaluation | Smoothness (Ra; µm) | 0.18 | 0.23 | 0.18 | 0.19 | 0.20 | 0.19 | 0.19 | 0.41 |
| | Corrosion resistance test (cold-rolled steel; cut portion) | 1.5 | 1.7 | 1.4 | 1.4 | 1.5 | 1.7 | 2.4 | 1.9 |
| | Corrosion resistance test (cold-rolled steel; edge portion) | 1.3 | 1.4 | 1.2 | 1.2 | 1.2 | 1.5 | 2.0 | 1.6 |
| | Corrosion resistance test (galvanized steel; cut portion) | 2.8 | 3.0 | 3.1 | 3.1 | 2.9 | 4.8 | 4.8 | 3.3 |
| | Corrosion resistance test (galvanized steel; edge portion) | 2.5 | 2.7 | 2.7 | 2.8 | 2.7 | 4.5 | 3.7 | 3.0 |

The amount of monobutyltin oxide is shown as the mass ratio (% by mass) to the solid contents of the binder resin; the amount of each pigment is shown as the mass percentage; and the zinc ion content (ppm) is a zinc compound concentration of a supernatant liquid obtained by centrifuging each composition for 1 hour at 12,000 round per minute.

<Smoothness Test>

The surface roughness (Ra) of the coating film was measured in accordance with JIS-B0601.

<Corrosion Resistance Test>

The obtained coated article was subjected to a corrosion test containing 16 hours of salt spray, 2 hours of drying, 4 hours of dipping in a salt water, and 2 hours of drying. The corrosion test was repeated 15 times, and the swell width of the one side of the cut portion was measured.

EXAMPLES 2 TO 6 AND COMPARATIVE EXAMPLE 1 TO 3

Lead-free electrodeposition coating compositions were prepared, electrodeposited to samples, and evaluated with respect to corrosion resistance, in the same manner as Example 1 except for changing the amounts of the aluminum tripolyphosphate pigment, the silicon oxide pigment, and the other pigments. The results are shown in Table 2.

It was clear from the above results that the lead-free cationic electrodeposition coating compositions containing a particular amount of the aluminum tripolyphosphate pigment and a particular amount of the silicon oxide pigment suitably used for products requiring high corrosion resistance such as automobile bodies, automobile parts, and home electric appliances.

The invention claimed is:

1. A method for coating an alloyed hot-dip galvanized steel plate with a cationic electrodeposition coating composition in which the lead content thereof is less than or equal to 10 ppm, and which includes a binder resin and a plurality of pigments, the method comprising:
   electrodepositing the lead-free cationic electrodeposition coating composition onto the alloyed hot-dip galvanized steel plate, wherein the binder resin includes a cationic base resin and a crosslinking agent, and the pigments include 5 to 30% by mass of pigment formed from a compound having an aluminum-containing cation and a phosphate-containing cation, and 5 to 30% by mass of a silicon oxide pigment having a pore volume of 0.44 to 1.8 ml/g and an average particle size of approximately 10 µm or less.

2. The method according to claim 1, wherein the cationic electrodeposition coating composition comprises 0.1 to 10% by mass of a monoalkyltin compound based on a mass of solid contents of the binder resin.

3. A coated article, comprising:

an alloyed hot-dip galvanized steel plate coated with a cationic electrodeposition coating composition in which the lead content thereof is less than or equal to 10 ppm which is electrodeposited on the steel plate, the cationic electrodeposition coating composition including a binder resin and a plurality of pigments, wherein the binder resin includes a cationic base resin and a crosslinking agent, and the pigments include 5 to 30% by mass of pigment formed from a compound having an aluminum-containing cation and a phosphate-containing cation, and 5 to 30% by mass of a silicon oxide pigment having a pore volume of 0.44 to 1.8 ml/g and an average particle size of 10 μm or less.

4. The coated article according to claim 3, wherein the cationic electrodeposition coating composition comprises 0.1 to 10% by mass of a monoalkyltin compound based on the a mass of the solid contents of the binder resin.

5. An automobile body, comprising:

an alloyed hot-dip galvanized steel plate coated with a cationic electrodeposition coating composition in which the lead content thereof is less than or equal to 10 ppm which is electrodeposited on the steel plate, the cationic electrodeposition coating composition including a binder resin and a plurality of pigments, wherein the binder resin includes a cationic base resin and a crosslinking agent, and the pigments include 5 to 30% by mass of pigment formed from a compound having an aluminum-containing cation and a phosphate-containing cation, and 5 to 30% by mass of a silicon oxide pigment having a pore volume of 0.44 to 1.8 ml/g and an average particle size of 10 μm or less.

6. The automobile body according to claim 5, wherein the cationic electrodeposition coating composition comprises 0.1 to 10% by mass of a monoalkyltin compound based on the a mass of the solid contents of the binder resin.

* * * * *